Figure 1:
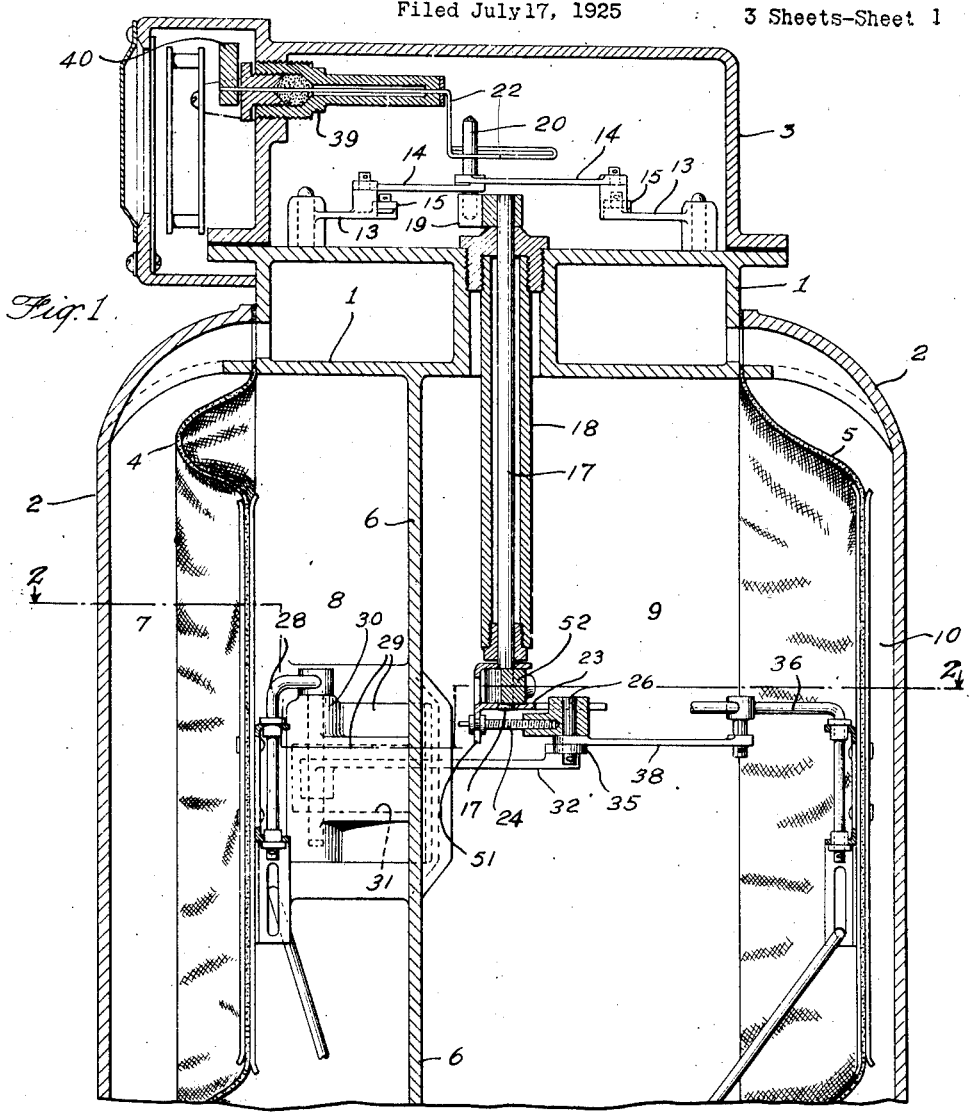

May 1, 1928.

A. R. HUETTIG

GAS METER

Filed July 17, 1925

1,668,078

3 Sheets-Sheet 1

INVENTOR
Arno R. Huettig
BY
John W. Thompson
his ATTORNEY

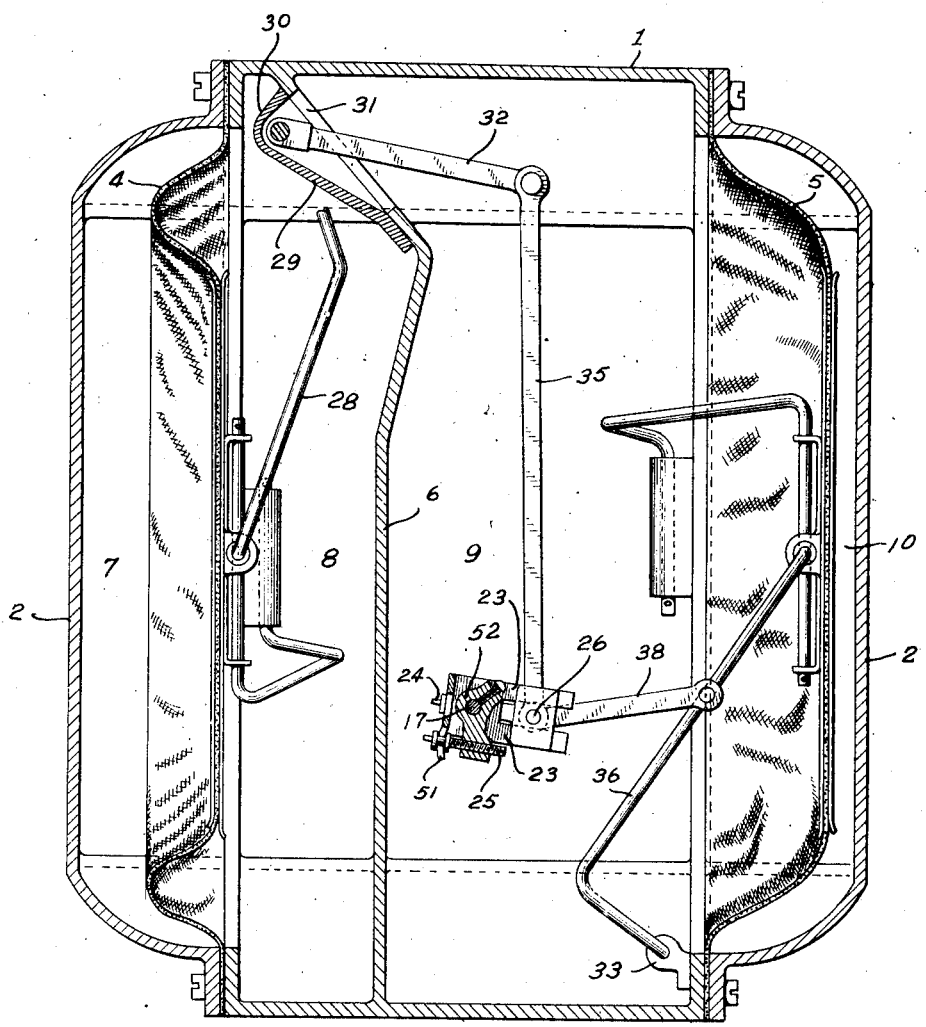

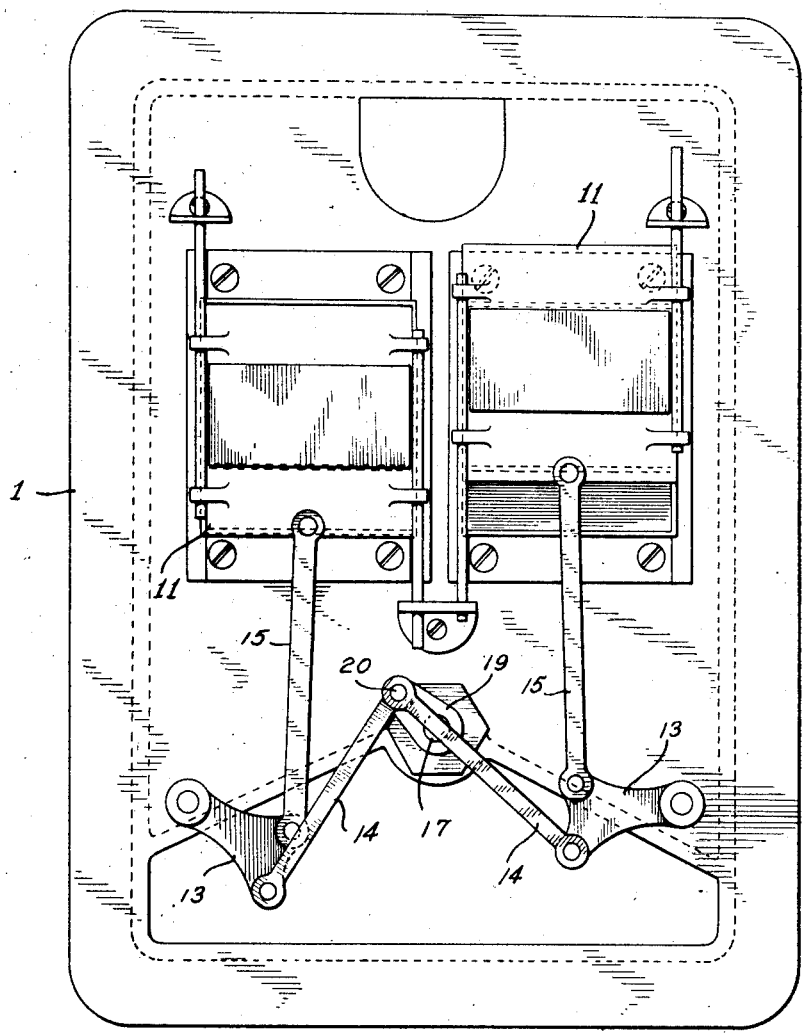

Patented May 1, 1928.

1,668,078

UNITED STATES PATENT OFFICE.

ARNO R. HUETTIG, OF ERIE, PENNSYLVANIA, ASSIGNOR TO THE AMERICAN METER COMPANY, INCORPORATED, OF NEW YORK, N. Y., A CORPORATION OF DELAWARE.

GAS METER.

Application filed July 17, 1925. Serial No. 44,157.

My invention relates to an improvement in gas meters more particularly of the type in which the body member or casing is advantageously made of cast metal and divided by means of a suitable partition and co-acting diaphragms into four measuring chambers, as distinguished from the general class of meters in which only three measuring chambers are provided, although it is obvious that my invention may be applied to meters of any other appropriate type or style. In some respects, the construction hereinafter to be described is equivalent in operation to the meter construction described and illustrated in my copending application, Serial No. 716,694 filed May 29, 1924. One object of the present invention has been to provide apparatus which will in general present the advantageous features of operation set forth with respect to the construction disclosed in said previous application, at the same time presenting features of construction which will for some purposes be preferred to those previously disclosed. For example, my present invention relates in part to improved valve mechanism and means for actuating the same.

A further object of the present invention has been to provide improved means for transmitting the movement of the crank shaft to the indicating and recording mechanism with a minimum of friction and in such a manner as to insure accurate performance of the apparatus.

A further object has been to provide novel and relatively simple means for adjusting the annular relation between the power transmitting crank arm and the power receiving crank arm, or the upper and lower cranks, respectively, on the crank shaft, and also novel and simple means for simultaneously adjusting the extent of movement of both diaphragms.

One embodiment of my invention is illustrated in the drawings accompanying the present specification, and in which Figure 1 is a central vertical section, Figure 2, a horizontal section on the line 2—2 of Figure 1, and Figure 3, a top plan view of the valve mechanism.

Referring to the drawings, the body member of the meter includes a central casing 1 provided with covers 2. A top cap 3 is secured to the central casing 1 by suitable means such as screws, not shown. Diaphragms 4 and 5 are secured in operative position with their outer edges clamped between the respective covers 2 and adjacent portions of the casing 1. A vertically disposed partition 6, preferably cast integral with the central casing divides the body member into two chambers which are in turn divided by the diaphragms 4 and 5 respectively, thus forming in effect four separate measuring chambers, 7, 8, 9 and 10. Valves 11 cooperate with openings in the top wall of the casing 1 to control the flow of gas from the chamber formed by the top cap into said measuring chambers and from the measuring chambers outward through a discharge port, not shown.

A vertically disposed crank shaft 17 is mounted on a support 18 and passes through an air-tight passage therein. The upper end of said support engages and closes an opening in the top wall of the central casing and thereby prevents the passage of gas through said opening. At the upper end of the crank shaft 17 is a power transmitting crank arm 19 provided with a pin 20, said pin being operatively connected to the valves 11 by suitable means including bell cranks 13, and links 14 and 15. The pin 20 is also positioned to engage a slot in the end portion of an index or indicator actuating lever 22 for the purpose of imparting rocking motion thereto in a horizontal direction. As indicated in Figure 1, a nipple 39 is mounted in a wall of the top cap 3 and supports the indicator actuating lever 22 which is provided at its outer end with an arm 40. In operation, it will be apparent that the pin 20, in its movement of rotation resulting from the rotation of shaft 17, will impart a rocking movement to the lever 22 so that the free or outer end thereof will have a similar movement, said outer end being positioned to operatively engage index or indicator means in any well known manner.

Referring to Figures 1 and 2, an arm 28 supporting diaphragm 5 and swinging in chamber 8 is journaled in a bearing 30 of bracket 29, said bearing being rendered air or gas tight by suitable means without interfering with free turning of the supporting arm 28 therein. A portion of the lower or bearing end of the supporting arm 28, after passing through the bearing 30, is exposed on the opposite side of the partition 6 or in chamber 9 through an opening 31 in said partition, thus making it possible to attach to said lower end of the supporting arm 28 a lever arm 32, by any suitable means such as a set screw, not shown, thus forming in effect a double arm lever having one arm 28 at one side of the partition and the other arm 32 at the opposite side thereof, and operating entirely within the chamber 9. The diaphragm 5 may conveniently be supported by means of an arm 36 journaled in a suitable bracket 33 within the chamber 9. The crank shaft 17 is provided with a slotted crank arm 23 having means for slidably supporting and engaging a crank pin 26 by means of which both diaphragms are connected to said crank arm 23 by means of links 35 and 38 respectively. A screw rod 24, Figure 1, is arranged longitudinally with respect to the slot in crank arm 23 and actuates the pin 26 for the purpose of adjusting the same and retaining it in any desired position of adjustment along the crank arm 23. One end of the crank arm 23 is bent to form a yoke which spans one end of the shaft 17 and is provided with a forked lug 51, Figure 2. One end of a screw rod 25 is threaded in an arm 52 secured to the shaft 17, the other end thereof engaging the slot in the forked end of lug 51. Thus, when screw rod 25 is rotated, the shaft 17 is also rotated by a corresponding amount and to that extent changes the annular position of crank arm 23 with respect to crank arm 19. When the screw rods 24 and 25 are in suitable position, they are readily accessible for manipulation by means of a proper tool which can readily be inserted through an opening in the wall of the casing 1, said opening being normally closed by means of a plug, not shown.

In operation, the reciprocating movement of the diaphragm 4 will be transmitted through lever 28, 32 and link 35 to the crank arm 23 while the reciprocating movement of diaphragm 5 will be transmitted from the lever 36 through link 38 to said crank arm 23, both links being connected to said arm by the same pin 26, and being therefore to that extent concentrically pivoted on said arm.

The driving power originating in the diaphragms is transmitted through shaft 17 to actuate the valves 11 through the connections above described. It has been found that undue frictional resistance develops in connection with the operation of various valve arrangements now known, but, with my improved positioning of the valves in parallel relation and moving the same by means of links which have a minimum of angular deflection, I measurably reduce friction and also greatly simplify the entire valve mechanism.

Furthermore, my improved construction provides a simple and accurately operating index actuating mechanism, which when cooperating with suitable index driving members, prevents the index from operating in the reverse direction regardless of the direction of rotation of shaft 17.

I claim as my invention:

1. In a gas meter, a valve actuating crank shaft having a crank arm with a crank pin, a pair of valves, a pair of bell cranks, a link connecting each of said valves with one of said bell cranks, and a link connecting each of said bell cranks with said crank pin.

2. In a gas meter, the combination of a main crank shaft having a crank arm with a crank pin, a pair of valves, index mechanism, an index operating crank shaft having a radially offset slotted portion at one end, the slot of which receives said crank pin, and means effectively positioned between said crank pin and each of said valves for actuating said valves.

3. In a gas meter, a casing, a main crank shaft having a crank arm with a crank pin, index mechanism, a crank shaft extending therefrom through a slot in said casing, an index actuating member at the outer end thereof, and a radially offset slotted portion at the inner end thereof, the slot of which operatively engages said pin.

In testimony whereof, I have signed my name to this specification this 15th day of July, 1925.

ARNO R. HUETTIG.